United States Patent [19]

Geesen

[11] 4,386,936
[45] Jun. 7, 1983

[54] PRODUCTION OF POTASSIUM CHLORIDE USING POND CRYSTALLIZATION

[75] Inventor: Donald H. Geesen, Wilcox, Canada

[73] Assignee: PPG Industries Canada Ltd., Regina, Canada

[21] Appl. No.: 8,363

[22] Filed: Feb. 1, 1979

[51] Int. Cl.³ .............................................. B01D 9/02
[52] U.S. Cl. .................................. 23/295 S; 23/298; 23/302 R
[58] Field of Search .............................. 23/296–300, 23/302 R, 295 S; 159/45, 47 R, DIG. 23, 17 R, 1 S; 203/12, DIG. 1

[56] References Cited

U.S. PATENT DOCUMENTS

| | | | |
|---|---|---|---|
| 1,216,187 | 2/1917 | Trump | 23/298 |
| 1,593,038 | 7/1926 | Silsbie | 23/298 |
| 1,594,707 | 8/1926 | Binder | 23/298 |
| 3,058,729 | 10/1962 | Dahms et al. | 23/302 |
| 3,365,278 | 1/1968 | Kelly et al. | 23/296 |
| 3,366,419 | 1/1968 | Pasternak et al. | 23/302 |
| 3,433,603 | 3/1969 | Jeffery | 23/300 |
| 3,440,023 | 4/1969 | Hoppe et al. | 23/302 |
| 3,592,615 | 7/1971 | Heitzel | 23/297 |
| 3,704,101 | 11/1972 | Kelly | 23/296 |
| 3,918,916 | 11/1975 | Garreh | 23/273 MT |
| 3,967,930 | 7/1976 | Sadan | 23/300 |

Primary Examiner—Hiram H. Bernstein
Attorney, Agent, or Firm—Irwin M. Stein; Walter M. Benjamin

[57] ABSTRACT

Disclosed is a method of increasing and maintaining high concentrations of potassium chloride in a refinery process stream of brine containing potassium chloride, sodium chloride and a minor amount of salt impurities by mixing with a first process stream potassium chloride crystallized from a pond wherein a brine from a second process stream is concentrated by solar evaporation and/or cooled by low ambient air temperatures.

17 Claims, 3 Drawing Figures

PRODUCTION OF POTASSIUM CHLORIDE USING POND CRYSTALLIZATION

BACKGROUND OF THE INVENTION

This invention relates to adding potassium chloride to a refinery process stream of brine containing potassium chloride, sodium chloride and a minor amount of salt impurities to increase and maintain a high concentration of potassium chloride. More therein particularly this invention relates to adding potassium chloride crystals that are precipitated from a pond which is concentrated by solar evaporation and/or cooled by ambient air temperature, or crystals produced from low temperature crystallization, e.g., refrigerated crystallizers or the like, to a potassium chloride refinery process stream.

Potassium chloride is solution mined by causing a solvent to be circulated through a subterranean ore deposit thereof and withdrawing a solution enriched in potassium chloride and sodium chloride. Several subterranean cavities are usually simultaneously developed and each mined upwardly through stratifications having rich and lean potassium chloride content. The combined withdrawn solution, usually saturated with sodium chloride, is processed in a refinery for the production of potassium chloride.

The refinery is designed so that an average concentration of brine from the several cavities can be processed in accordance with the average potassium chloride in the deposit as a whole. But, these designs are usually too inflexible to handle a wide variation of salt concentration in the feed, such as when rich or lean stratifications are mined simultaneously. Consequently, when the concentration of the feed is low, an excess amount of energy is expended per unit of potassium chloride produced and, when the concentration of the feed is high, only an overdesigned system is able to handle the feed.

One method that helps to alleviate the aforesaid problem is a refinery process that includes the use of multiple effect evaporators to concentrate the feed solution with respect to potassium chloride while precipitating sodium chloride. In this method the solution that passes through the first evaporator effect is allowed to become saturated with respect to both potassium chloride and sodium chloride, thereby precipitating both salts and the precipitated salts are forwarded to a hotter effect wherein the potassium chloride is re-dissolved, for example, see U.S. Pat. No. 3,704,101.

In another method, solution mined brine of potassium chloride ore is forwarded to a pond wherein it is concentrated by solar evaporation, thereby precipitating in a slow process both potassium chloride and sodium chloride. The salts are then harvested by machinery which scrapes up all solids including sodium chloride and impurities. Potassium chloride is separated from the sodium chloride and other impurities by froth flotation, which typically yields potassium chloride crystals that are relatively impure and as a consequence must be further purified with respect to sodium chloride content to attain high grade crystals.

SUMMARY OF THE INVENTION

It has been found that the potassium chloride concentration of a refinery process stream can be increased and maintained high by mixing with a first process stream (e.g., a feed stream to or between multiple effect evaporators or multiple stage crystallizers) potassium chloride crystals precipitated from a solar evaporated and/or ambient air cooled pond. Even though the potassium chloride precipitate from the solar evaporated and/or ambient air cooled pond typically contains large amounts of precipitated sodium chloride and minor amounts of salt impurities, such as sulfates and chlorides of other metals, the precipitate is effectively used by mixing the precipitate with the refinery process stream at a temperature so that at least some but preferably all of the potassium chloride content of the precipitate is selectively dissolved, leaving sodium chloride and salt impurities substantially undissolved. The solid impurities can then be separated from the solution in an elutriation leg of the mixing vessel or by other separation techniques known in the art.

A portion of the feed to evaporators, crystallizer effluent, relatively weak solution mined brine from subterranean cavities, or other process streams, that are preferably saturated with respect to potassium chloride, can be used to fill and replenish the crystallizing pond. After solar energy has concentrated the solution and/or low ambient air temperature cooled the pond brine to precipitate potassium chloride (usually with sodium chloride and salt impurities), mechanical equipment removes the precipitants from the pond or the precipitants are removed in a slurry with their mother liquor. In one embodiment of the invention, a slurry of the precipitants is mixed with feed to one evaporator of multiple stage evaporators to increase the concentration of potassium chloride therein by selective dissolution. Undissolved sodium chloride and salt impurities can be separated by settling into the bottom of the evaporator elutriation leg from which the settling sodium chloride and impurities solids are removed and from which mother liquor is recycled back to another evaporator. Then the high concentration solutions (mother liquor) are processed for production of potassium chloride.

In another embodiment, undissolved sodium chloride and salt impurities are separated by settling into the bottom of an elutriation vessel which is separate from an evaporator or crystallizer vessel. In this elutriation vessel, high concentration mother liquor is displaced by lower concentration liquor with which the settled sodium chloride and impurities solids are removed and disposed. As a consequence, this invention has the advantage of incorporating with the economical process of pond crystallization the separation of precipitated salts from mother liquor by elutriation. Moreover, the desideratum of increasing and maintaining high concentration feed solutions is attained.

BRIEF DESCRIPTION OF THE DRAWINGS

Further benefits and advantages will become apparent from the detailed description made below with referrence to the drawings in which.

DETAILED DESCRIPTION OF THE INVENTION

Figure 1:
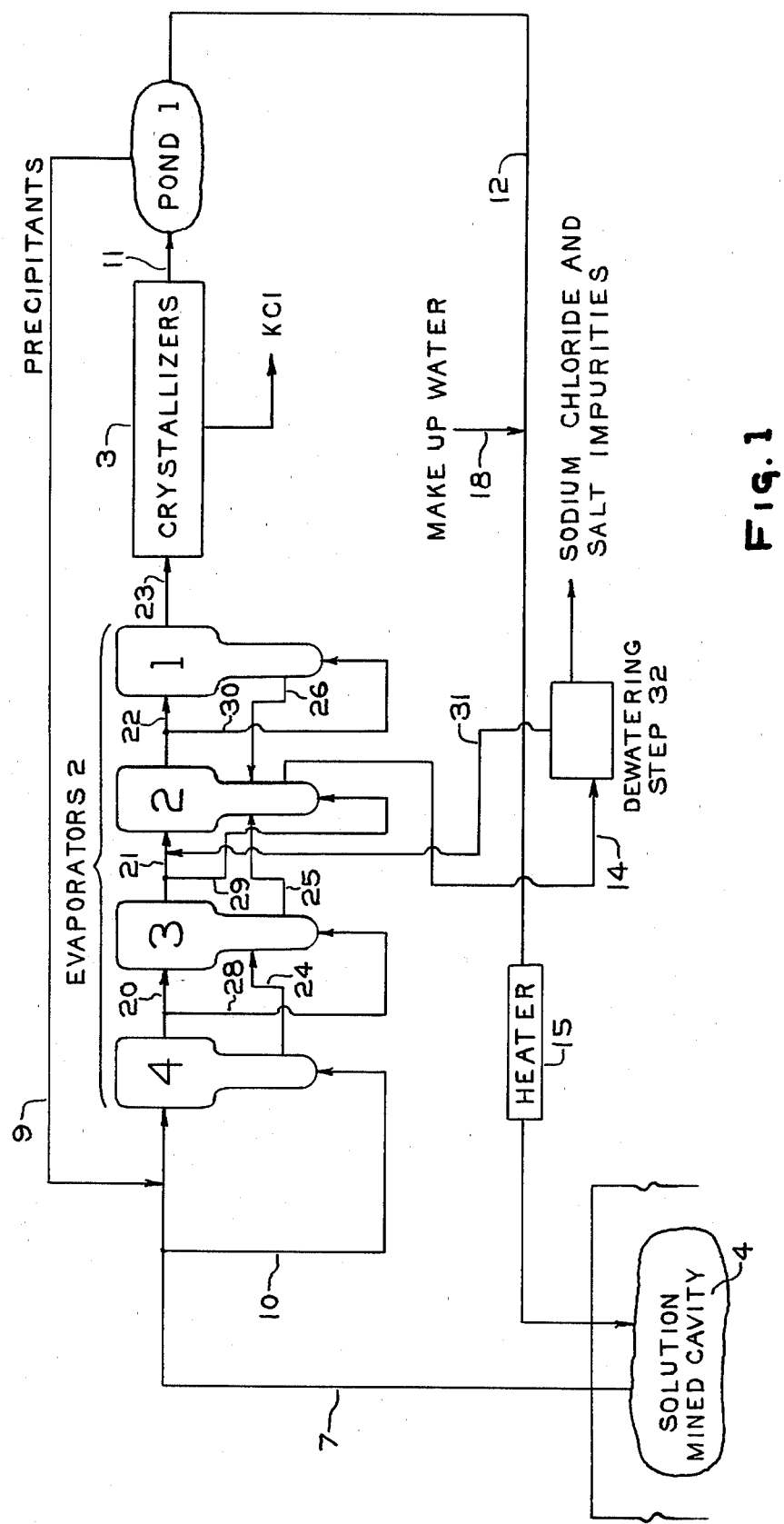
FIG. 1 diagramically illustrates a method in which a pond is used to crystallize potassium chloride, which is mixed with raw feed to an evaporator; and where crystallizer mother liquor effluent is fed to the pond.

According to the present invention potassium chloride precipitated from a pond as a result of concentration by solar evaporation and/or cooling by ambient air is mixed with a refinery process stream in order to increase and maintain high concentrations of potassium chloride therein. The term "Ponds" as used herein, includes large aqueous bodies which are exposed to the heat of the sun and/or ambient air temperatures. Sodium chloride and salt impurities solids usually associated with the potassium chloride precipitated in this fashion are removed from the process resulting stream after all potassium chloride is dissolved; thereafter, the resultant enriched solution is treated to recover potassium chloride therefrom.

The solution mined brine typically is saturated with respect to sodium chloride, or in any event more concentrated with respect thereto, than with respect to potassium chloride and contains a minor amount of salt impurities, e.g., sulfates. This occurs because subterranean deposits normally contain on an average no more than about 30 percent potassium chloride by weight with the remainder being predominantly sodium chloride along with minor amounts of salt impurities such as chlorides and sulfates of calcium and magnesium. Thus, in a refinery process, all the process streams are likely to be saturated with respect to sodium chloride. In order for the solution to yield potassium chloride, it must also be saturated with respect thereto. Hence, throughout the refinery process, with the exception of raw feed thereto, most streams are typically saturated with respect to both sodium chloride and potassium chloride. Consequently, the potassium chloride in any of these process streams can serve as the source of the potassium chloride which is precipitated from the pond. According to a preferred embodiment, process streams that are hotter than the atmospheric temperature prevailing during the time that the pond precipitates the salts are especially suitable as feeds to the pond because cooling as well as concentration by solar evaporation can be used to effect precipitation. Moreover, in the event a process stream unsaturated with respect to sodium chloride is available, it is a preferred feed to the pond since a lesser amount of sodium chloride has to be removed from the process stream with which it is mixed. But, provision is made, as described herein, to separate essentially all precipitated sodium chloride and other salt impurities from the potassium chloride, thus giving rise to an important aspect of the present invention, i.e. purity of potassium chloride crystals.

Accordingly, process streams which can be used for filling and replenishing the pond (i.e., streams which serve as a source for potassium chloride to be precipitated by solar evaporation and/or ambient air cooling) include evaporator feed, which may be at or near saturation with respect to potassium chloride, mother liquor effluent from evaporative crystallizers wherein potassium chloride is precipitated by cooling the pregnant mother liquor, brine from newly developed solution mined cavities, or mother liquor effluent from a flash evaporator wherein feed is concentrated to saturation with respect to potassium chloride. Other process streams can also be used to fill and/or replenish the pond as well. Brine from newly developed solution mined cavities (i.e., subterranean cavities which yield solution mined brine relatively weak in potassium chloride) is typically used as a solvent for cavities which yield relatively strong brine. When this relatively weak brine is near the borderline of being strong enough for process feed, it can be reduced in potassium chloride content in a pond before being used as a solvent in another cavity. This provides a solvent with a greater driving force while potassium chloride produced can enhance the concentration of a refinery process stream.

One or more ponds can be constructed and filled with the aforedescribed solution. These ponds are constructed in such a manner to ensure that there is substantially no leakage; to provide a large surface area; and to facilitate ease in removal of precipitated solids. Lining the ponds with a suitable liner is a well known method of preventing leakage and thus eliminating environmental impact. In some applications, this lining must be able to support conventional mechanical earth moving equipment which may be used to harvest the precipitated solids. However, some soils may not require special precautions against leakage such as the use of linings. Other precautions may be provided for in the pond design to protect against flash flooding and the like, methods of which are known in the art.

The ponds can be harvested once annually to reap the solids which precipitate as a result of either concentration by evaporation during summer or as a result of cooling during winter or both. After the coldest part of the winter, enough mother liquor can be removed to enable total evaporation in the summer. Water can be added to the pond to avoid precipitation of sodium chloride when cooling is the principal means of precipitation, but a reduction in potassium chloride yield which ensues in normal circumstances can make it prohibitive economically. In any event, solids are removed mechanically after near total evaporation and/or after removal of mother liquor, or alternatively, solids from the pond can be finely broken and slurried in the form of about a 35 volume percent slurry, using pond fluid as the slurry mother liquor, and pumped to a process stream with which it is to be mixed. Other well known methods of harvesting are possible as well.

In some cases it may be desirable to allow the precipitates to accumulate over two or more years to optimize ease and/or economics in harvesting. In this case a portion or all of the mother liquor is removed in the coldest part of the winter, leaving only enough for total evaporation during the summer. The pond is then refilled during the fall or late summer to further precipitate the salts during the following winter and summer. Water is again removed during the coldest part of the winter or before. This cycle is continued annually until the desired amount of precipitates has accumulated. The salts are then harvested as described above.

The precipitate from the pond can be mixed with one or more process streams to substantially increase the potassium chloride concentration therein. The amount of mixing and the streams mixed depend in part on the method used to recover potassium chloride from the brine. Provision must be made (as herein described) to heat the stream (if necessary) to dissolve potassium chloride to the exclusion of sodium chloride and other salt impurities when present (selectively dissolve potassium chloride). In many cases the precipitate can be mixed with raw feed to the refinery process. Thus, the process can be designed for a high concentration raw feed whereby a greater amount of potassium chloride is produced at nearly the same cost, owing to the absence of fluctuations in concentration therein. For this embodiment it is preferred that enough potassium chloride be provided by the pond to augment the potassium chloride concentration of the raw feed so that its potassium chloride concentration is maintained at the highest uniform concentration. A greater benefit can be derived thereby from a total increase in concentration (a concentration greater than that of the highest fluctuation).

When feed to the refinery process is initially concentrated by backward fed multiple effect evaporation, the pond precipitates can be fed into a second evaporator effect (where the first evaporator effect is the hottest) wherein brine is concentrated with respect to potassium chloride while precipitating sodium chloride and wherein the concentration with respect to potassium chloride may become low owing to a portion of the second evaporator effect overflow (all of which would otherwise be forwarded to the first evaporator effect) being used for overflow mixing with the first evaporator effect to reduce flashing as taught by co-assigned co-pending application Ser. No. 892,453, filed Apr. 3, 1978, now U.S. Pat. No. 4,224,036. Enough mother liquor along with the precipitate is also fed into the evaporator to dissolve potassium chloride solids at the evaporator temperature. The remainder of the precipitate can be fed into the last evaporator effect so that the heat therein is used for heating enough precipitate and dissolving enough potassium chloride so that less heat, preferably no heat, is lost in the form of low value steam therefrom.

In a further embodiment, where feed to the refinery process is not initially concentrated by multiple effect evaporation, the pond precipitate can be fed into a flash evaporator wherein raw feed is concentrated to saturation with respect to potassium chloride and wherefrom effluent is fed directly to a crystallizer wherein potassium chloride is produced. This embodiment is advantageous where raw feed is unsaturated with respect to potassium chloride at the raw feed temperature, where flashing does not by itself saturate the solution and/or where less flashing can saturate the solution with respect to potassium chloride.

When the precipitate from the pond contains sodium chloride and other salt impurities such as sulfates, removal thereof after mixture is accomplished, in accordance with a preferred embodiment of this invention, by allowing the solids to settle in a vessel having an elutriation leg after all potassium chloride is dissolved at the required temperature. The solids can be withdrawn from the bottom of the elutriation leg in a slurry and dewatered such as by centrifugation or the solids can be elutriated with a solution weak with respect to potassium chloride content, which weak solution displaces the rich solution from the solids within the leg while the solids are removed from the bottom of the leg in a slurry with the weak solution to be disposed therewith. Hence, an important aspect of the present invention is realized here. Since potassium chloride crystals produced by pond concentration and/or cooling are not a product of a controlled environment and, as a consequence, there is a potential for high impurity levels and undesirable product size, redissolving these crystals allows the potassium chloride to be recrystallized under more controlled conditions which enhances crystal purity and size. Further, the crystals are purified by being dissolved away from precipitated sodium chloride and salt impurities crystals.

Reference is now made to FIG. 1 which illustrates an embodiment of the present invention. Cavity 4 is solution mined and the enriched solution contains potassium chloride, sodium chloride, and a minor amount of chlorides and sulfates of magnesium and calcium. Raw feed solution 7 at 51° C. and containing 13 parts potassium chloride per 100 parts water and saturated with respect to sodium chloride, is withdrawn from cavity 4 and fed into the fourth effect of multiple effect evaporators 2, hereinafter called evaporators 2. Enough precipitate from pond 1 is forwarded to raw feed 7 to increase the concentration thereof with respect to potassium chloride to saturation at 73° C., i.e., about 27 parts potassium chloride per 100 parts water, which is saturation at the third evaporator effect temperature. In this embodiment, it is preferred that enough precipitate is added to raw feed 7 so that the fourth evaporator effect only acts as a heater and it is more preferable that enough precipitate is added to raw feed 7 to increase the concentration thereof with respect to potassium chloride to saturation at the second evaporator effect temperature since slurry is forwarded and recycled thereto via streams 24, 25, and 26 and removed therefrom via stream 14.

Since the solution of stream 7 is saturated with respect to sodium chloride, sodium chloride solids contained in stream 9 are not dissolved in the fourth evaporator effect of evaporators 2 because its solubility does not change significantly with temperature. Stream 10 is taken from raw feed 7 to elutriate the fourth evaporator effect of evaporators 2. Streams 28, 29, and 30 are taken from overflows 20, 21, and 22 to elutriate the third, second and first evaporator effects, respectively. Sodium chloride from stream 9 and sodium chloride precipitated in the third and fourth evaporator effects, therefore, is elutriated therein. Ultimately, the slurry of the sodium chloride and impurities is forwarded to the second evaporator effect of evaporators 2 via streams 24 and 25. Sodium chloride and impurities slurries from the first evaporator effect is fed backward to the second evaporator effect of evaporators 2 and substantially all solid sodium chloride and impurities are purged therefrom and from the system via stream 14, dewatered in dewatering step 32 and the mother liquor is recycled to overflow stream 21 via stream 31. Overflows 20, 21, and 22 from the fourth, third and second evaporator effects, respectively, are forwarded to the first evaporator effect.

Mother liquor effluent from evaporators 2 (first evaporator effect) at 110° C. and containing about 36 parts potassium chloride per 100 parts water is forwarded via stream 23 to evaporative crystallizers 3 wherein the liquor is cooled to about 24° C. Thus, effluent 11 contains about 15 parts potassium chloride per 100 parts water and is forwarded to pond 1. The climate is such that pond 1 is cooled to about 0° C. during the winter whereby the pond liquor is reduced to about 10 parts potassium chloride per 100 parts water. Hence, 5 parts potassium chloride is produced in the pond per each 100 parts water in the liquor. So, on this basis the pond 1 is made large enough to cool all of stream 11.

After the coldest temperature of the winter, the mother liquor of pond 1 is pumped off so that upon subsequent warming of the pond, little potassium chloride is redissolved. Further, during the summer some of the little water that remains is evaporated. During the autumn, the pond precipitates are harvested and crushed as necessary for handling ease and for mixture with the raw feed 7.

The mother liquor effluent from the pond is mixed with make up water 18, heated in heater 15 (this heating may be optional) and injected into cavity 4 for further solution mining of ore. Several cavities are mined in this manner with the effluent from crystallizers 3 sometimes by-passing pond 1 to go directly to stream 12.

Figure 2:
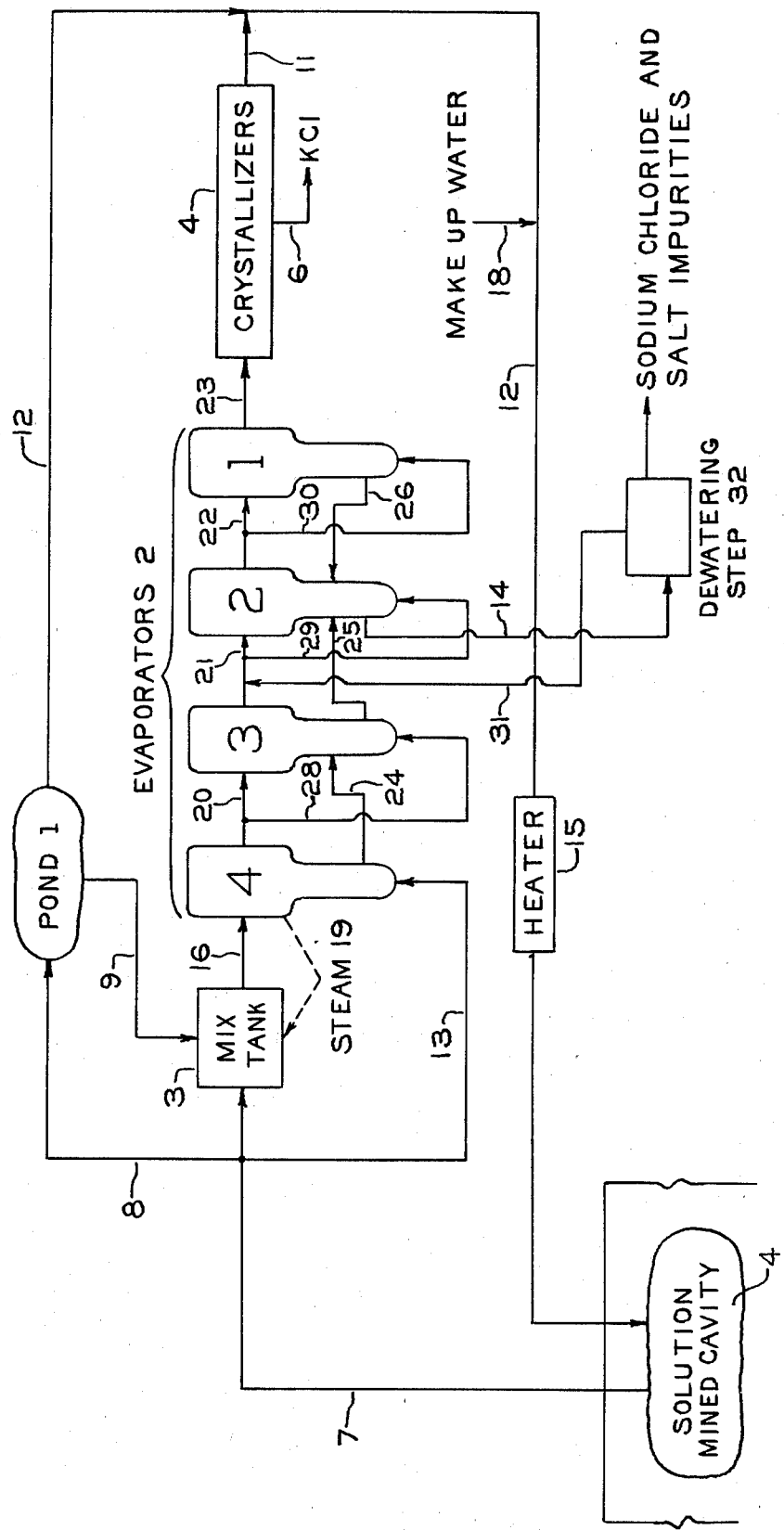
FIG. 2 diagramically illustrates the use of a pond as in FIG. 1 except that a portion of the raw feed to the evaporators is fed to the pond from which precipitants and the remainder of the raw feed is fed to a mix tank.

Reference is now made to FIG. 2 wherein like numbers refer to like elements of FIG. 1 and which illustrates a further embodiment of the present invention. As in FIG. 1, cavity 4 is solution mined by solvent 12 and raw feed 7 withdrawn therefrom containing about 13 parts potassium chloride per 100 parts water. Part of raw feed 7 fills and replenishes pond 1 which in this case only produces 3 parts potassium chloride per 100 parts water after being cooled to 0° C. The precipitated solids of pond 1 which are harvested as hereindescribed with respect to the embodiment illustrated by FIG. 1, are mixed via stream 9 with the remainder of raw feed 7 in mix tank 3. Steam 19 from the fourth evaporator effect and external sources is supplied to mix tank 3 to maintain the temperature thereof at 53° C. Enough precipitate is added to mix tank 3 to require all the low value steam from the fourth evaporator effect for heating the precipitate and dissolving potassium chloride. Effluent from mix tank 3 is forwarded to the fourth evaporator effect via stream 16. Sodium chloride solids and salt impurities contained in precipitate 9 fall to the bottom of the fourth evaporator effect into its elutriation leg wherein the solids are elutriated by solution 13 from raw feed 7. A slurry 24 of the solids and solution 13 is withdrawn from the leg of the fourth evaporator effect and forwarded to the third evaporator effect wherein essentially all of the solid potassium chloride dissolves (the remainder, if any, dissolves in the second effect evaporator).

Mother liquor is forwarded through the fourth, third, second, and first evaporator effects wherein the solution is concentrated with respect to potassium chloride while precipitating sodium chloride by evaporation at progressively higher temperatures up to 110° C. At 110° C. the solution containing about 36 parts potassium chloride per 100 parts water is cooled in evaporative crystallizers 4 to about 24° C. thereby producing potassium chloride via stream 6 and leaving an effluent 11 containing 15 parts potassium chloride per 100 parts water. This stream 11 is mixed with stream 12 and make up water 18, heated via heater 15 (optional), and reinjected into cavity 4 for further dissolving of ore.

Figure 3:
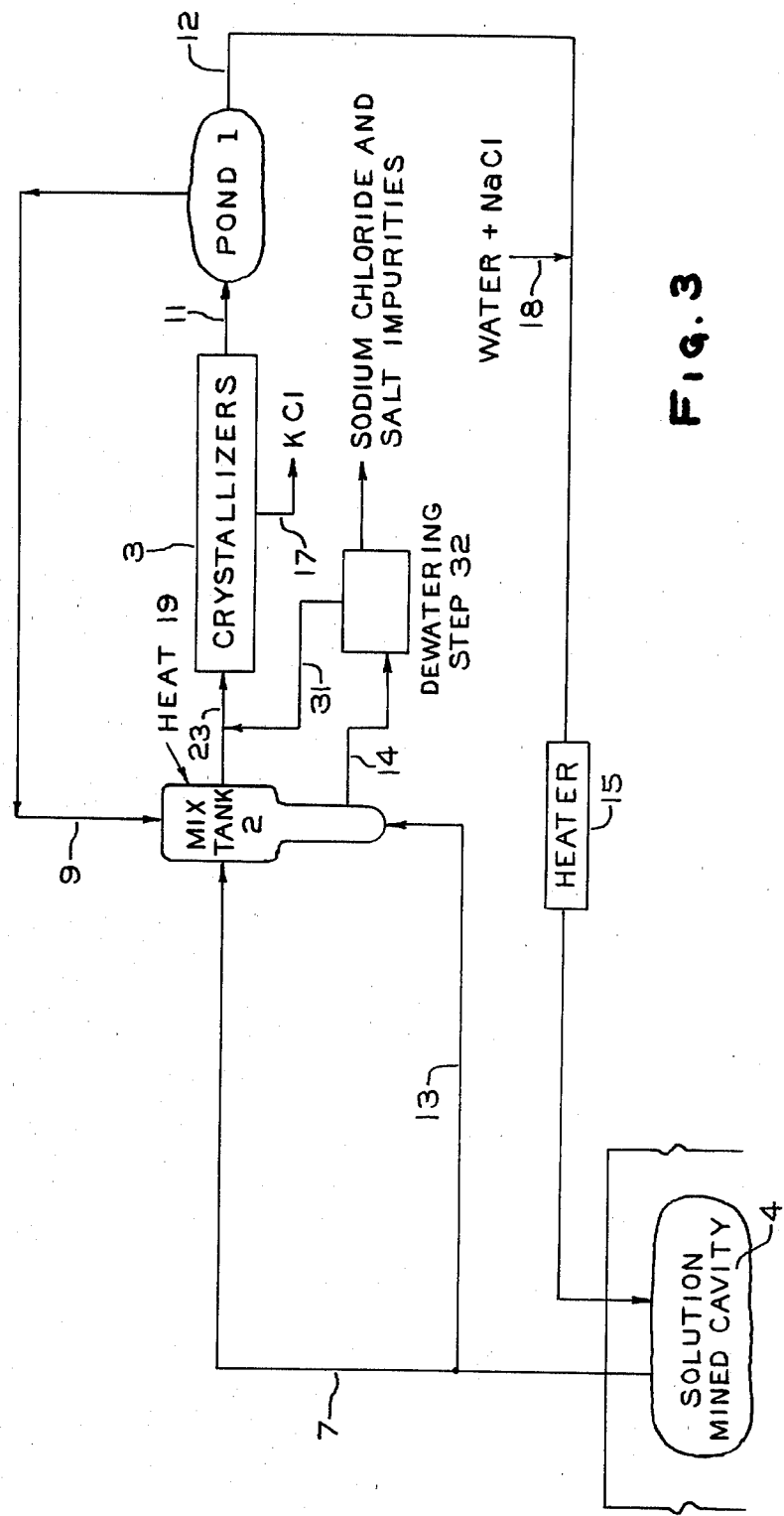
FIG. 3 diagramically illustrates the use of a pond to crystallize potassium chloride, which is mixed with raw feed in a mix tank in which sodium chloride and salt impurities are separated and from which solution is fed directly to crystallizers.

Reference is now made to FIG. 3 which illustrates an even further embodiment of the present invention. Cavity 4 is mined with an aqueous solvent at various saturations with respect to sodium chloride to include a slurry of sodium chloride supplied via stream 18. Hence, in this case, potassium chloride in cavity 4 is selectively mined to various extents. Solution enriched in potassium chloride is withdrawn from cavity 4 to make raw feed with which precipitates 9 from pond 1 are mixed in mix tank 2. Enough steam 19 is provided in mix tank 2 to dissolve all potassium chloride contained in precipitate 9. As described with reference to FIG. 1, undissolved solids from precipitate 9 are elutriated by stream 13, withdrawn with stream 14 and dewatered in dewatering step 32 while mother liquor is recycled to stream 23 via stream 31.

Overflow 23 from mix tank 2 is forwarded to crystallizers 3 wherein the solution is cooled to about 24° C. whereby potassium chloride is precipitated and removed via stream 17. Crystallizer mother liquor effluent 11 is forwarded to pond 1 wherein it is treated in accordance with the aforedescribed embodiment made with reference to FIG. 1.

It can readily be seen that advantage can be taken of the present invention by producing the potassium chloride crystals by some method other than pond cooling. Atmospheric and refrigerated crystalizers can similarly produce crystals from a process stream, where the crystals are unusually impure, unusually small, i.e. 50% or more of the distribution smaller than 14 mesh, or otherwise undesirable, and mix with another process stream to enhance the potassium chloride concentration therein. Separation of the crystal from the impurity and creation of a controlled environment for crystal growth is effected by the process of the present invention as in the case of pond cooling.

It will be apparent to those skilled in the art that the described embodiments of the invention are subject to a proliferation of modifications. It is, therefore, only intended that these described embodiments limit the invention insofar as cited in the claims.

What is claimed is:
1. In the method of producing potassium chloride from solution mined brine containing potassium chloride, sodium chloride and minor amount of other metal salts wherein said solution mined brine is withdrawn from a subterranean cavity in a potassium chloride-containing ore deposit and forwarded to a refinery wherein potassium chloride crystals are produced from the solution mined brine, the improvement which comprises:
   a. introducing brine liquor containing potassium chloride, sodium chloride and a minor amount of other metal salts into a pond crystallizer and coprecipitating crystals of said salts therein,
   b. adding salt crystals coprecipitated in said pond crystallizer to solution mined brine forwarded to said refinery to produce a salt crystal-brine slurry,
   c. heating the salt crystal-brine slurry to dissolve potassium chloride crystals present in said slurry to produce a potassium chloride enriched brine,
   d. separating sodium chloride and other metal salt crystals from the potassium chloride enriched brine, and
   e. preferentially precipitating potassium chloride crystals from the potassium chloride enriched brine.

2. The method of claim 1 wherein the brine liquor introduced into the pond crystallizer is solution mined brine, mother liquor effluent obtained from refinery crystallizers or mother liquor effluent obtained from a refinery flash evaporator.

3. The method of claim 1 or 2 wherein salt crystals are precipitated in the pond crystallizer by solar evaporation.

4. The method of claim 1 or 2 wherein salt crystals are precipitated in the pond crystallizer by ambient air cooling.

5. The method of claim 1 or 2 wherein mother liquor from the pond crystallizer is forwarded to a subterranean cavity for solution mining further potassium chloride.

6. The method of claim 1 or 2 wherein the refinery contains evaporators, and salt crystals coprecipitated in the pond crystallizer are added to solution mined brine feed to the refinery evaporators and the potassium chloride crystals in the resulting salt crystal-brine slurry are dissolved in the refinery evaporators.

7. The method of claim 6 wherein the potassium chloride crystals in the salt crystal-brine slurry are dissolved in the coolest evaporator effect.

8. The method of claim 1 or 2 wherein salt crystals coprecipitated in the pond crystallizer are added to solution mined brine feed to the refinery in a mixing tank, the potassium chloride crystals in the resulting salt crystal-brine slurry are dissolved in the mixing tank and solution mined brine enriched in potassium chloride forwarded to a refinery evaporator.

9. The method of claim 1 or 2 wherein salt crystals coprecipitated in the pond crystallizer are added to solution mined brine in a mixing tank, the potassium chloride crystals in the resulting salt crystal-brine slurry are dissolved in the mixing tank, undissolved sodium chloride and other metal salts are separated from the solution mined brine enriched in potassium chloride in the mixing tank, and effluent from the mixing tank forwarded to a refinery crystallizer.

10. In the method of producing potassium chloride from solution mined brine containing potassium chloride, sodium chloride and a minor amount of other metal salts wherein said solution mined brine is withdrawn from a subterranean cavity in a potassium chloride-containing ore deposit and forwarded to a refinery wherein solution mined brine is concentrated in an evaporation step and the concentrated brine cooled in a cooling step, thereby selectively precipitating potassium chloride crystals, the improvement which comprises a. introducing brine liquor containing potassium chloride, sodium chloride and a minor amount of other metal salts into a pond crystallizer and coprecipitating crystals of said salts therein, b. adding salt crystals coprecipitated in said pond crystallizer to solution mined brine forwarded to said refinery to produce a salt crystal-brine slurry, c. heating salt crystal-brine slurry to dissolve potassium chloride crystals present in said slurry to produce a potassium chloride enriched brine, d. separating sodium chloride and other metal salt crystals from the potassium chloride enriched brine, e. concentrating potassium chloride enriched brine in the refinery evaporation step, and f. cooling the concentrated brine in the refinery cooling step to preferentially precipitate potassium chloride crystals from the concentrated brine.

11. The method of claim 10 wherein the evaporation step comprises multiple effect evaporators operated at progressively higher temperatures and the cooling step comprises multiple stage crystallizers.

12. The method of claim 11 wherein potassium chloride crystals in the salt crystal-brine slurry are dissolved in one of the multiple effect evaporators.

13. The method of claim 12 wherein the multiple effect evaporator in which potassium chloride crystals are dissolved is the coolest evaporator.

14. The method of claim 10 wherein the potassium chloride crystals in the salt crystal-brine slurry are dissolved in a mixing tank and the potassium chloride enriched brine forwarded to the refinery evaporation step.

15. The method of claim 10, 11, 12 or 14 wherein the brine liquor introduced into the pond crystallizer is solution mined brine, mother liquor effluent obtained from the refinery cooling step or mother liquor effluent obtained from a refinery flash evaporator.

16. The method of claim 10 wherein mother liquor from the pond crystallizer is forwarded to a subterranean cavity for solution mining further potassium chloride.

17. The method of claim 15 wherein the mother liquor from the pond crystallizer is forwarded to a subterranean cavity for solution mining further potassium chloride.

* * * * *